US012787947B2

(12) United States Patent
Abeles

(10) Patent No.: US 12,787,947 B2
(45) Date of Patent: Nov. 10, 2026

(54) SEED CONTAINERS FOR ENABLING WATER AND VEGETATION TO PENETRATE A HYDROPHOBIC LAYER AFTER A FOREST FIRE

(71) Applicant: VIRIDIS ARBOR LLC, Verona, NJ (US)

(72) Inventor: Gary E Abeles, Verona, NJ (US)

(73) Assignee: VIRIDIS ARBOR LLC, Verona, NJ (US)

( * ) Notice: Subject to any disclaimer, the term of this patent is extended or adjusted under 35 U.S.C. 154(b) by 66 days.

(21) Appl. No.: 18/700,343

(22) PCT Filed: Sep. 1, 2022

(86) PCT No.: PCT/US2022/042322
§ 371 (c)(1),
(2) Date: Apr. 11, 2024

(87) PCT Pub. No.: WO2023/075927
PCT Pub. Date: May 4, 2023

(65) Prior Publication Data

US 2024/0407306 A1 Dec. 12, 2024

(51) Int. Cl.
*A01C 14/00* (2006.01)
*A01G 9/029* (2018.01)
(Continued)

(52) U.S. Cl.
CPC ............ *A01G 9/0291* (2018.02); *A01C 14/00* (2013.01); *A01G 9/0295* (2018.02); *B64D 1/12* (2013.01); *B64U 2101/40* (2023.01)

(58) Field of Classification Search
CPC .... A01G 9/0291; A01G 9/0295; A01C 14/00; B64D 1/12; B64U 2101/40
See application file for complete search history.

(56) References Cited

U.S. PATENT DOCUMENTS 2,394,192 A * 2/1946 Mann ........................ A01G 9/02 47/1.01 R
4,031,832 A * 6/1977 Edwards .............. A01C 11/006 47/73

(Continued)

FOREIGN PATENT DOCUMENTS

JP 6768746 B2 10/2020
KR 20140068414 A * 6/2014 ............. A01G 9/021
KR 1020140068414 A 6/2014

OTHER PUBLICATIONS

KR20140068414A Translation (Year: 2014).*
(Continued)

*Primary Examiner* — Kimberly S Berona
*Assistant Examiner* — Steven J Shur
(74) *Attorney, Agent, or Firm* — Maine Cernota & Curran

(57) ABSTRACT

A device and method for penetrating a hydrophobic layer caused by a fire and introducing new vegetation into a forest floor includes seeds, seedlings, and/or saplings carried within a plurality of tapered containers, possibly mixed with soil, sand, gravel, fertilizer, SAP granules, and/or water. The containers are inserted into the ground through the hydrophobic layer by dropping or propelling them from an aircraft, or manually pressing on them. One or more holes proximate the bottoms of the containers enable rain water and germinating roots to penetrate into soil beneath the hydrophobic layer. A perforated lid can prevent the seeds or seedlings from being ejected upon impact with the forest floor. A weighted tip can improve penetration of the containers into the forest floor. A plurality of tapered containers can extend downward from a tray or frame. The container and/or perforated lid can be made from biodegradable materials.

19 Claims, 10 Drawing Sheets

(51) Int. Cl.

| | |
|---|---|
| ***B64D 1/12*** | (2006.01) |
| *B64U 101/40* | (2023.01) |

(56) References Cited

U.S. PATENT DOCUMENTS

| | | | | | |
|---|---|---|---|---|---|
| 4,333,265 | A * | 6/1982 | Arnold | ..................... | B64D 1/10<br>221/92 |
| 4,347,686 | A | 9/1982 | Wood | | |
| 8,341,882 | B2 | 1/2013 | Weder | | |
| 2019/0116719 | A1 * | 4/2019 | Fletcher | ................... | B64D 1/16 |
| 2021/0092909 | A1 | 4/2021 | Doyle | | |

OTHER PUBLICATIONS

Spice, Byron,. "Engineered Magic: Wooden Seed Carriers Mimic the Behavior of Self-Burying Seeds", [Carnegie Mellon University], [retrieved on May 30, 2024]. Retrieved from the Internet <URL: https://www.cs.cmu.edu/news/2023/engineered-magic >.

International Search Report and Written Opinion for PCT Appl. No. PCT/US2022/042322, 9 pages.

Office Action for U.S. Appl. No. 19/222,317 mail date Jul. 18, 2025, 24 pages.

* cited by examiner

SEED CONTAINERS FOR ENABLING WATER AND VEGETATION TO PENETRATE A HYDROPHOBIC LAYER AFTER A FOREST FIRE

RELATED APPLICATIONS

This application is a national phase application filed under 35 USC § 371 of PCT Application No. PCT/US2022/42322 with an International filing date of Sep. 1, 2022, which is incorporated herein by reference in its entirety for all purposes.

This application claims the benefit of U.S. Provisional Application No. 63/272,960, filed Oct. 28, 2021, which is herein incorporated by reference in its entirety for all purposes.

FIELD OF THE INVENTION

The invention relates to restoration of a forest after a forest fire, and more particularly, to preventing mudslides and introducing new vegetation into a forest floor after a forest fire.

BACKGROUND OF THE INVENTION

Ecological recovery after a forest fire has always been a challenge, especially in heavily vegetated areas that are unpopulated, or only sparsely populated. Furthermore, recent trends in global climate change have resulted in consistently higher temperatures and persistent droughts in many areas, which in turn have increased the risks and the occurrences of major fires in wilderness and other sparsely populated areas. In particular, fifteen of the largest wildfires that have ever been recorded in the United States have occurred within the past ten years.

With reference to FIG. 1, during intense forest fires, a waxy substance derived from the burning plant material is formed. Initially created as a gas, this substance penetrates into the topsoil and then hardens, creating what is called a "hydrophobic layer" 102 above the underlying layer of normal soil 104. This hydrophobic layer 102 prevents rainwater from sinking into the ground and reaching the underlying soil 104 that would otherwise be able to absorb the water. A thin layer of ash 100 may be formed on top of the hydrophobic layer 102, but is insufficient to absorb rain water falling onto a mountain or other sloping surface after a forest fire, so that the rainwater has no choice but to flow downhill primarily on top of the hydrophobic layer 102, carrying with it the layer of ash 100 and any debris that it may encounter, as well as any normal soil that it flows over. The result is what is commonly referred to as a mudslide.

Often, in the aftermath of a forest fire, an effort is made to stabilize the soil 104 by introducing new ground cover 106 into the area, typically by dropping seeds onto the burned-over ground that will hopefully take root and reduce the likelihood and/or severity of mudslides. However, the roots of the new vegetation 106 have difficulty penetrating through the hard hydrophobic layer 102, which means that, typically, the roots will be mainly on the surface of the ground above the hydrophobic layer 102. The new vegetation 106 will therefore be poorly anchored to the ground, and easily carried away with flowing rainwater, becoming part of a mudslide.

It should be noted that, for ease of expression, the term "forest" is used generically herein to refer to any heavily vegetated area that is a wilderness area, an otherwise unpopulated area, or a sparsely populated area, whether or not the vegetation is primarily trees, and the term "forest fire" is used generically herein to refer to any fire that takes place in such a heavily vegetated area. The terms "trees" and "ground cover" are used herein to refer to any type of vegetation that is relatively large and relatively small, respectively.

What is needed, therefore, is an apparatus and method for increasing absorption of rainwater into soil after a forest fire, and for introducing new ground cover into an area that has experienced a forest fire, such that rainwater runoff will be reduced and the new ground cover will effectively stabilize the soil, thereby reducing the threat of mudslides and consequent erosion of the land.

SUMMARY OF THE INVENTION

The present invention is an apparatus and method for increasing absorption of rainwater into soil below a hydrophobic layer after a forest fire, and for introducing new ground cover into an area that has experienced a forest fire, thereby reducing the threat of mudslides and consequent erosion of the land.

The disclosed apparatus is a seed planting device that comprises a pointed or otherwise tapered container, which in embodiments is shaped as a cone or as a truncated cone, which contains one or more seeds and/or small, germinated seedlings or saplings. In embodiments, the seeds and/or seedlings and/or saplings are mixed with a seed and soil mixture 304, which can include any combination of soil, sand, gravel, water, and/or nutrients (i.e. fertilizer). Super-absorbent polymer (SAP) granules can also be included in the seed and soil mixture, so that the germinated vegetation will be better able to survive extended periods of dry weather. Water can also be included within the tapered container so as to increase its weight and further promote germination and growth of the contained seed(s) and/or seedling(s) and/or saplings. At least one opening is provided at or near the bottom of the seed container through which water can seep and roots can emerge, but which are small enough to prevent significant loss of the seeds, seedlings, saplings, and/or soil and seed mixture.

It should be noted that, for ease of expression, the phrase "soil and seed mixture" is used herein to refer to any combination of seeds and/or seedlings as well as any mixture of one or more materials, such as sand, gravel, water, super-absorbent polymer (SAP) granules, and/or nutrients (i.e. fertilizer), with any combination of one or more seeds and/or seedlings and/or saplings. It should also be noted that term super-absorbent polymer (SAP) is used herein to refer to a polymer that is able to absorb at least 200 times its weight of water. It should further be noted that, unless otherwise required by context, the term "seeding cone" is used herein to refer to all embodiments of the disclosed tapered seed container, whether the container is shaped as a cone, as an inverted pyramid, or in any other tapered shape.

In some embodiments of the disclosed method the seeding cones are treated as projectiles, wherein after a forest fire a plurality of the seeding cones are dropped or propelled onto and into the forest floor from an aircraft, such as a piloted helicopter, a remote-controlled winged aircraft, or a remotely controlled drone. The aircraft can include a global positioning system and/or a wind direction and speed sensor so as to more accurately drop or propel the projectiles to the desired locations.

Due to the shape and weight of the seeding cones, in these embodiments they impact the forest floor with sufficient impact energy to penetrate into the ground through the hydrophobic layer. In some of these embodiments, the impact energy of the seeding cones is entirely derived from gravitational acceleration after the seeding cones are released from the aircraft, while in other of these embodiments the seeding cones are energetically propelled from the aircraft, for example by a compressed gas and/or a chemical explosive.

In some embodiments the seeding cone is terminated by a weighted and hardened tip that is designed to provide additional weight, energy, and penetrating power to the seeding cone. In some of these embodiments, the tip is designed to break away from the seeding cone and/or rapidly biodegrade after impact with the forest floor, thereby providing an opening in the bottom of the seeding cone through which water and roots can penetrate.

In various embodiments, a plurality of tapered containers are mounted such that they all extend downward from a common frame, while the tops of the tapered containers extend to openings through the common frame. In these embodiments, the tapered containers typically do not contain seeds or seedlings. Instead, a single seed or seedling, or sapling, or a plurality of seeds, seedlings and/or saplings are included in a soil and seed mixture provided in an upper compartment that extends upward from the frame. The weight of the assembly is sufficient to cause all of the cones to penetrate through the hydrophobic layer, due to gravity and/or ballistic propulsion. Some of these embodiments enable larger plants to be established, such as saplings that are intended to replace the burned trees of the forest, because the roots of the plant can extend simultaneously through all of the plurality of seeding cones, thereby establishing a larger root system than might be possible for a plant that is germinated within a single seeding cone.

In other embodiments of the disclosed method, the seeding cones are pressed into the soil by personnel on the ground. In some of these embodiments, a plurality of the seeding cones are mounted to a tray, such that the cones extend below the tray. The tray can then be placed on the ground and the seeding cones can be simultaneously pressed onto the soil, for example by stepping on the tray.

As a result of the penetration of the seeding cones into the soil, holes are "punched" by the seeding cones through the hydrophobic layer, thereby providing a path for rainwater to seep into the seeding cones and through the openings near the bottom of the tapered container into the water-absorbent soil that is beneath the hydrophobic layer.

Furthermore, upon germination of the seeds and/or maturation of the seedlings within the tapered container or upper chamber, the roots of the new ground cover grow out through the openings near the bottom of the tapered container(s) and into the soil that is beneath the hydrophobic layer, thereby anchoring the new foliage to the underlying soil so that it cannot be easily washed away by flowing surface water or mud.

In embodiments, each seeding cone or chamber includes a perforated or porous lid or screen that is fixed to the container above the contained soil and seed mixture. For example, the lid can be a wire mesh or a porous fabric such as burlap or coir. The openings in the lid are small enough to prevent any significant quantity of the soil and seed mixture from being ejected through the top of the seeding cone upon impact with the forest floor, while being large enough to allow rainwater to enter the seeding cone. As the new ground cover germinates and grows, it is either able to pass through the openings in the lid or it bursts through the lid if the lid is made from a frangible material such as a perforated sheet of cellulose.

The lid can be fixed to the cone by any attachment means known in the art, including by an adhesive, by fasteners such as rivets or screws, or by tabs that extend from the lid through openings provided in the cone and are bent upward or downward, thereby fixing the lid to the cone while only slightly affecting the aerodynamics of the seeding cone. In some embodiments the lid is spaced above the upper surface of the seed and soil mixture, and thereby provides partial shade to newly germinated seedlings or saplings until they have grown sufficiently to pierce or pass through the lid.

In embodiments, the seeding cones and/or lids are made from one or more biodegradable materials, such as from AshCrete, hempcrete clay, Timbercrete, bamboo, recycled wood, coir, and/or other recycled materials, so that after the danger of mudslides has abated and the new vegetation has been established, the seeding cones and lids biodegrade and blend into the soil.

A first general embodiment of the present invention is a seed planting device that includes a tapered container having a top and a bottom, wherein a cross-sectional area of the top is larger than a cross-sectional area of the bottom, at least one hole penetrating the tapered container proximate the bottom thereof, and one or more seeds, seedlings, and/or saplings contained within the tapered container.

Embodiments further include a porous or perforated lid fixed to the tapered container above said plurality of seeds and/or seedlings.

In any of the above embodiments, the tapered container can be shaped substantially as a cone or a truncated cone.

In any of the above embodiments, the one or more seeds and/or seedlings and/or saplings that are contained within the tapered container can be mixed with at least one of soil, sand, gravel, super-absorbent polymer granules, fertilizer, and water.

In any of the above embodiments, the bottom of the tapered container can terminate in a point. Or the at least one hole can includes an opening at the bottom of the tapered container.

In any of the above embodiments, the at least one hole can include at least one hole penetrating a side of the tapered container proximate the bottom thereof.

Any of the above embodiments can further include a weighted and pointed tip extending from the bottom of the tapered container. In some of these embodiments, the weighted and pointed tip is made from a biodegradable material.

In any of the above embodiments that include a weighted and pointed tip, the weighted and pointed tip can be configured to be pushed away from the bottom of the tapered container by roots growing downward from new vegetation arising from the seeds and/or seedlings and/or saplings, thereby leaving an opening in the bottom of the tapered container.

In any of the above embodiments, the tapered container can be made from at least one biodegradable material. In some of these embodiments, the at least one biodegradable material includes at least one of AshCrete, hempcrete clay, coir, Timbercrete, bamboo, and recycled wood.

A second general aspect of the present invention is a seed planting tray or common frame from which a plurality of tapered containers according to any embodiment of the first general aspect extend downward.

In embodiments, the tray or common frame is configured to press the seeding cones into the forest floor, and then release the seeding cones when the tapered containers have been inserted into the forest floor and the tray or common frame is lifted upward.

Any of the above embodiments can further include a seed chamber above the tray or common frame that is configured to contain at least one seed or seedling or sapling, whereby as the at least one seed or seedling or sapling germinates and/or grows, it is able to extend roots downward into a plurality of the tapered containers.

A third general aspect of the present invention is a method of planting vegetation in a forest floor after a forest fire that has created a hydrophobic layer on the forest floor. The method includes providing a plurality of seed planting devices according to any embodiment of the first or second general aspects, and dropping or propelling the plurality of seed planting devices from an aircraft onto the forest floor, such that the plurality of tapered containers penetrate through the hydrophobic layer, thereby enabling rain water to flow through the hydrophobic layer via the seed planting devices, and causing vegetation arising from the seeds and/or seedlings and/or saplings that are contained within the tapered containers to take root at least partially in soil that is beneath the hydrophobic layer.

In embodiments, the aircraft is one of a piloted helicopter, a remotely controlled winged aircraft, and a remotely controlled hovering drone.

In any of the above embodiments, the impact energy of the seed planting devices can be derived entirely from gravitational acceleration after being released from the aircraft, or the seed planting devices can be ballistically propelled from the aircraft toward the forest floor. In some of these embodiments, the seed planting devices are ballistically propelled by at least one of a compressed gas and a chemical explosive.

In any of the above embodiments, the plurality of tapered containers can extend downward from a common frame, and the seed or seedling can be contained in an upper chamber attached to the common frame such that as the seed or seedling germinates and/or grows, it is able to extend roots through the plurality of tapered containers.

A fourth general aspect of the present invention is a method of planting vegetation in a forest floor after a forest fire that has created a hydrophobic layer within the forest floor. The method includes providing a plurality of seed planting devices according to any embodiment of the first or second general aspect, attaching the seed planting devices to a rigid tray, such that the seeding devices extend downward from the tray, placing the tray and seed planting devices onto the ground, such that the tray is suspended above the ground by the seed planting devices, pressing downward on the tray, thereby simultaneously pushing all of the seed planting devices into the ground, so that they penetrate through the hydrophobic layer, and removing the tray from the seed planting devices, whereby the seed planting devices remain in the ground and continue to penetrate the hydrophobic layer, thereby enabling rain water to flow through the hydrophobic layer via the seed planting devices, and causing vegetation arising from the seeds and/or seedlings, and/or saplings that are contained within the seed planting devices to take root at least partially in soil that is beneath the hydrophobic layer.

In embodiments, the seed planting devices are attached to the tray by frangible gaskets that prevent the seed planting devices from gravitationally falling away from the tray, while allowing the seed planting devices to remain in the ground when the tray is removed after the seed planting devices have been pressed into the ground.

And in any of the above embodiments, pressing downward on the tray can include stepping on the tray.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an apparatus and method for increasing absorption of rainwater into soil below a hydrophobic layer of a forest floor after a forest fire, and for introducing new ground cover into an area that has experienced a forest fire, thereby reducing the threat of mudslides and consequent erosion of the land.

Figure 1:
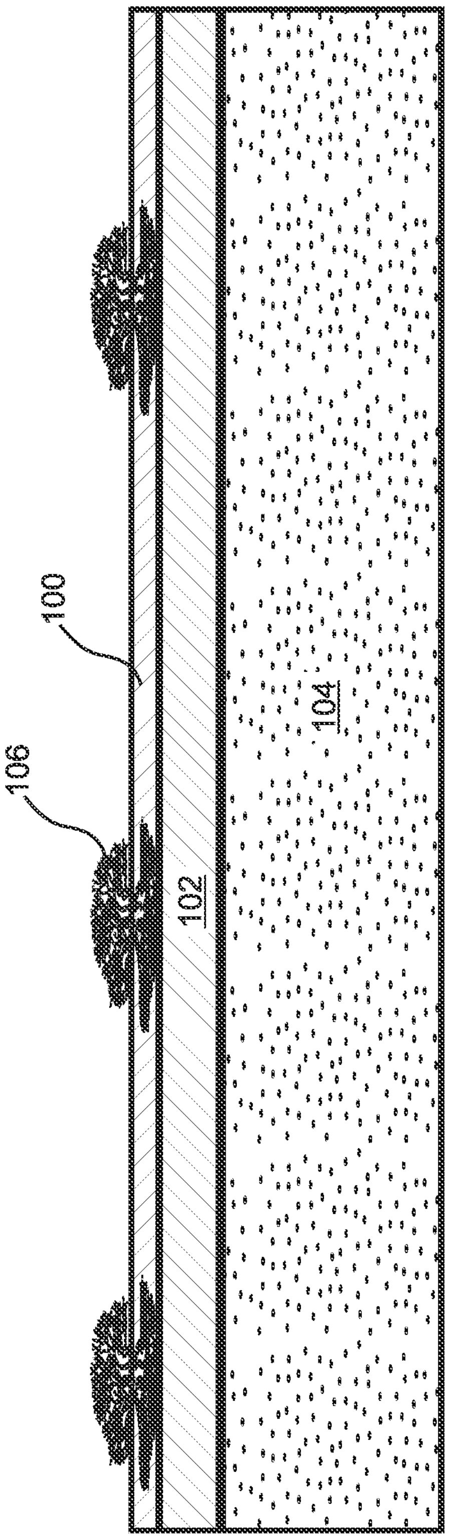
Fig. 1 (Prior Art)
FIG. 1 is a cross section indicating a prior art method of introducing vegetation into a forest after a fire.
Figure 2:
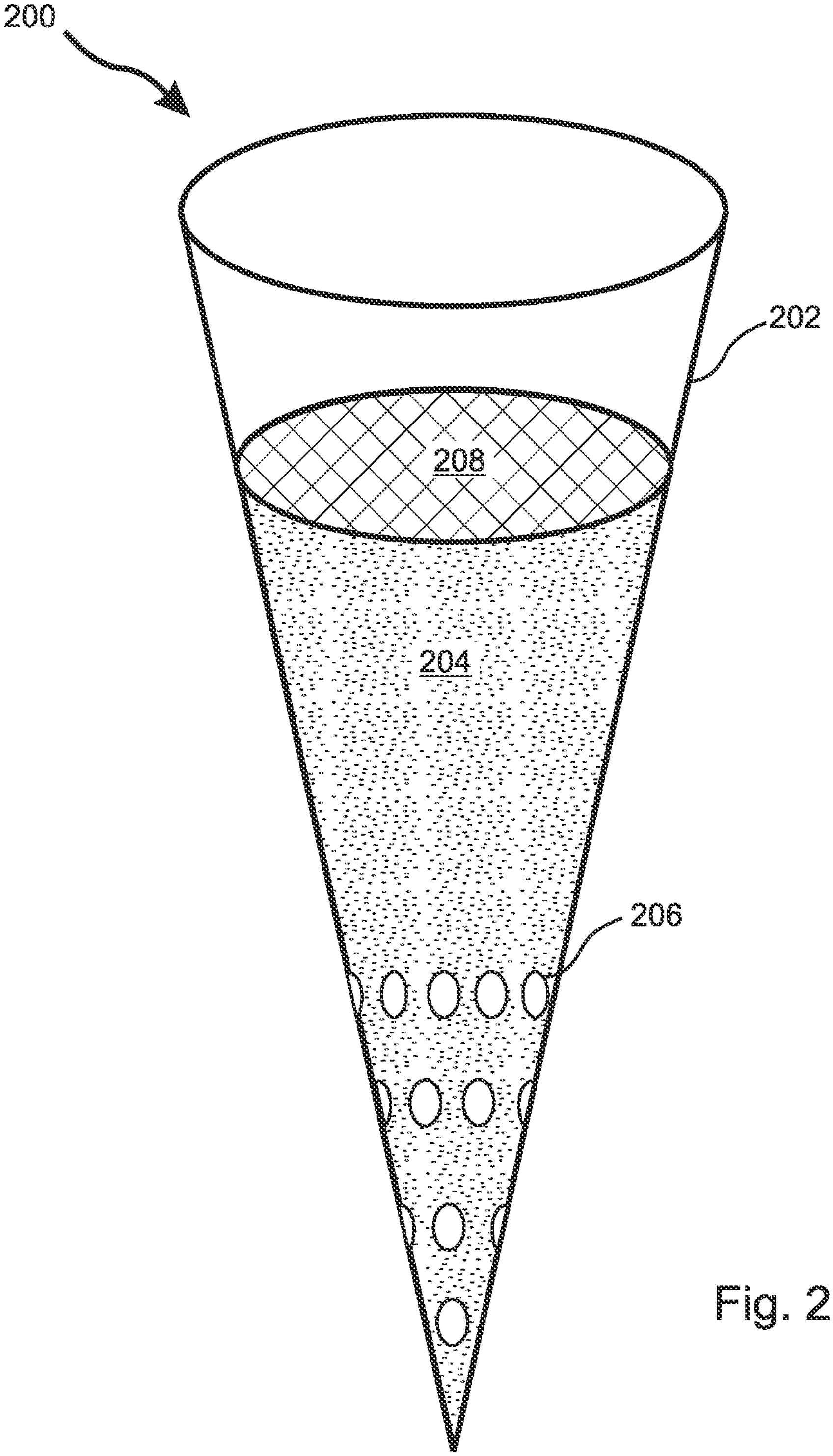
FIG. 2 is a perspective view of a seed planting device in an embodiment of the present invention.

With reference to FIG. 2, the disclosed seed planting device 200 comprises a pointed or otherwise tapered container 202, which in the illustrated embodiment is shaped as a pointed cone 202, that contains a "soil and seed mixture," from which seeds and/or seedlings and/or saplings will ultimately mature. For ease of expression, the phrase "soil and seed mixture" is used herein generically to refer to one or more seeds and/or seedlings and/or saplings, and to any mixture 204 of a material such as sand, gravel, super absorbent polymer (SAP) granules, and/or soil with seeds and/or seedlings and/or saplings. Similarly, the term "seeding cone" is used herein to generically refer to the seed planting device, whether or not the tapered container is shaped as a cone, unless otherwise required by context.

At least one opening 206 is provided at or near the bottom of the tapered container 202 through which water can seep, but which are small enough to prevent significant loss of the soil and seed mixture 204.

In the embodiment of FIG. 2, the seed planting device 200 includes a perforated or porous lid or screen 208, such as a wire screen or porous fabric, that is fixed to the cone 202 above the contained seed and soil mixture 204. The openings in the lid 208 are small enough to prevent any significant amount of the seed and soil mixture 204 from being ejected through the top of the cone 202 upon impact with the forest floor 300, while being large enough to allow water to pass through the lid 208 and into the tapered container 202. The lid 208 can be made from a frangible material, such as a sheet of cellulose, such that germinating and growing plant life can burst upward through the lid, or the holes in the lid 208 can be large enough to allow the stems or branches to pass through. In some embodiments the lid 208 is spaced above the upper surface of the seed and soil mixture 204, and thereby provides partial shade to newly germinated seedlings or saplings as they extend above the seed and soil mixture 204 within the tapered container 202 until the seedlings have grown sufficiently to pierce or pass through the lid.

The lid 208 can be fixed to the cone 202 by any attachment means known in the art, including by an adhesive, by a fastener such as a rivet or screw, or by tabs that extend from the lid through slots or other openings provided in the cone 202 and are bent upward or downward, thereby fixing the lid 208 to the cone 202 while only slightly impacting the aerodynamics of the seeding cone 200. In some embodiments the lid 208 is perforated only in a central region thereof, for example in cases where the seeding cone 200 is relatively large as compared to the seedling or sapling that will emerge after germination. A larger tapered container 202 might be implemented, for example, to increase the weight and perforating power of the seeding cone 200.

Figure 3:
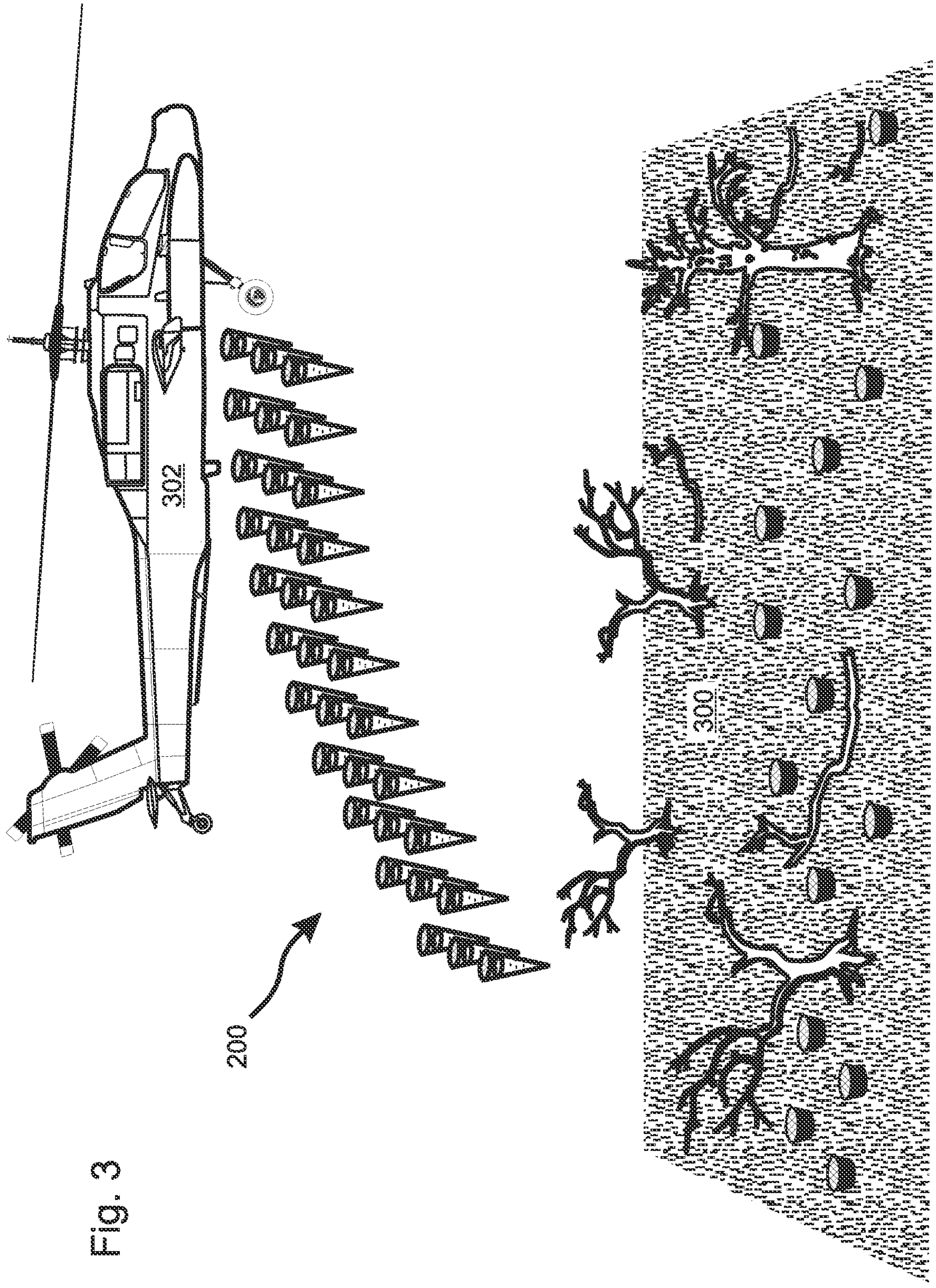
FIG. 3 illustrates dropping of a plurality of the seed planting devices of FIG. 2 onto a forest floor after a fire.

With reference to FIG. 3, in embodiments of the disclosed method, after a forest fire a plurality of the "seeding cones" 200 are treated as seeding projectiles in that they are dropped or propelled onto the forest floor 300 from an aircraft 302 The aircraft 302 can include a global positioning system and/or a wind direction and speed sensor so as to more accurately drop or propel the projectiles 200 to the desired locations. In the embodiment of FIG. 3A, the projectiles 200 are dropped from a piloted helicopter 302. In other embodiments, the aircraft 302 can be a remote-controlled winged aircraft or a remotely controlled drone.

Figure 4A:
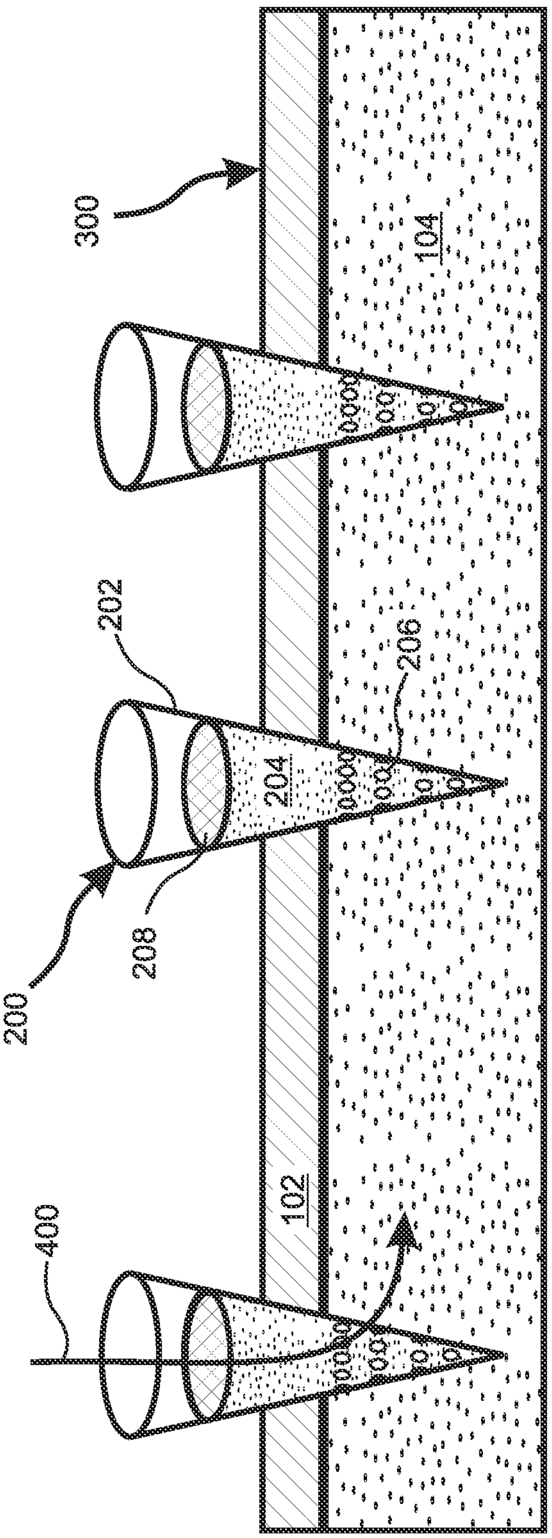
FIG. 4A is a cross section illustrating penetration of the seed planting devices of FIG. 3 into the forest floor.

With reference to FIG. 4A, due to the shape and weight of the seeding cones 200, they impact the forest floor 300 with sufficient energy to penetrate into the ground through the hydrophobic layer 102 thereby allowing rainwater to seep into and through the tapered containers 202, and out through the openings 206 near the bottom of the tapered container 202 into the underlying soil 104, as is indicated 400 in the drawing. As a result, rainwater is less likely to pool on top of the hydrophobic layer 102 to form a major downhill flood. In some of these embodiments, the impact energy of the seeding cones 200 is derived entirely from gravitational acceleration, while in other of these embodiments the seeding cones 200 are energetically propelled toward the forest floor 300, for example by a compressed gas or a chemical explosive.

Figure 4B:
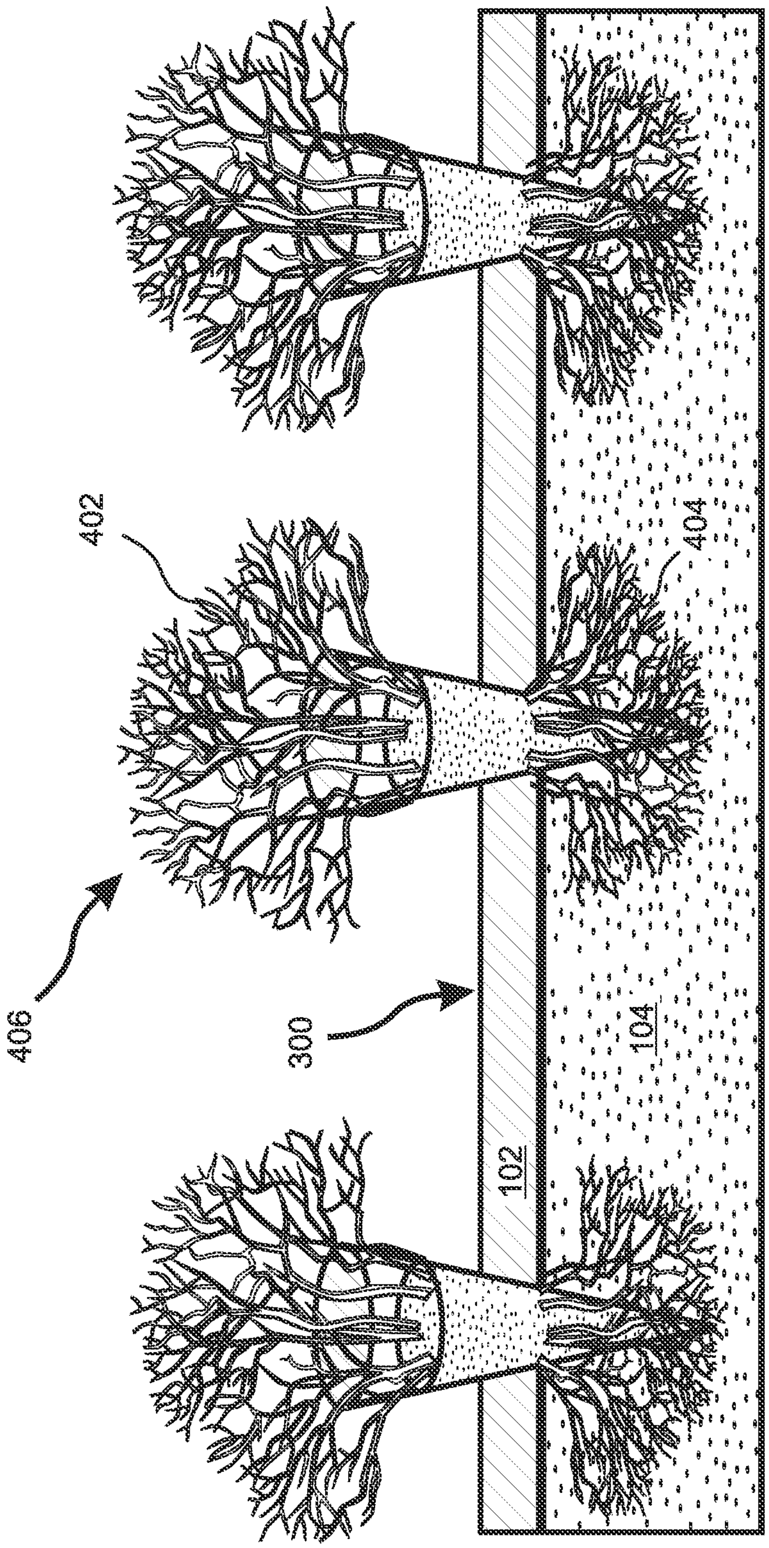
FIG. 4B illustrates the growth of vegetation and the penetration of roots into the soil below the hydrophobic layer that arises from germination and/or growth of the seeds and/or seedlings delivered by the seed planting devices.

With reference to FIG. 4B, upon germination of the seeds and/or seedlings within the tapered container 202, the roots 404 of the new ground cover 406 grow out through the openings 206 at or near the bottom of the tapered container 202 and into the soil 104 that is beneath the hydrophobic layer 102, thereby anchoring the new vegetation 402 to the underlying soil layer 104, and further reducing the threat of mudslides.

Figure 5B:
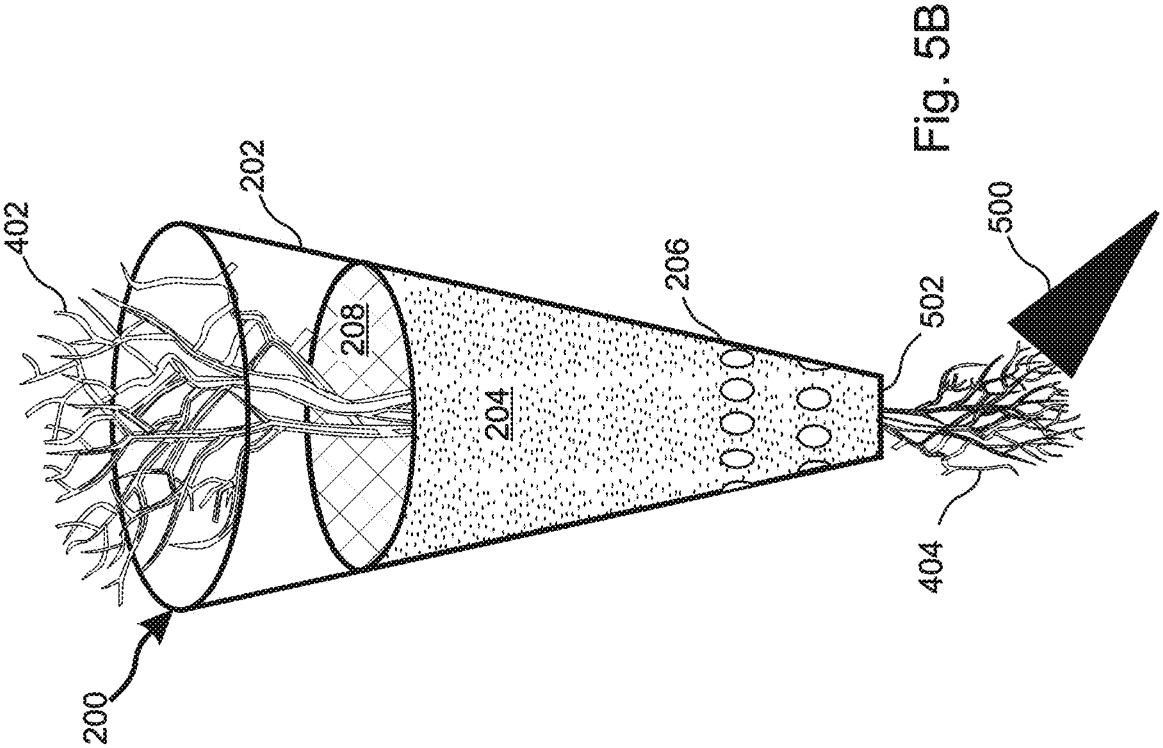
FIG. 5B is a perspective view of the seed planting device of FIG. 5A, shown after deployment of the seed planting device, wherein sprouted roots have pushed the weighted tip away from the bottom of the seed planting device.
Figure 5A:
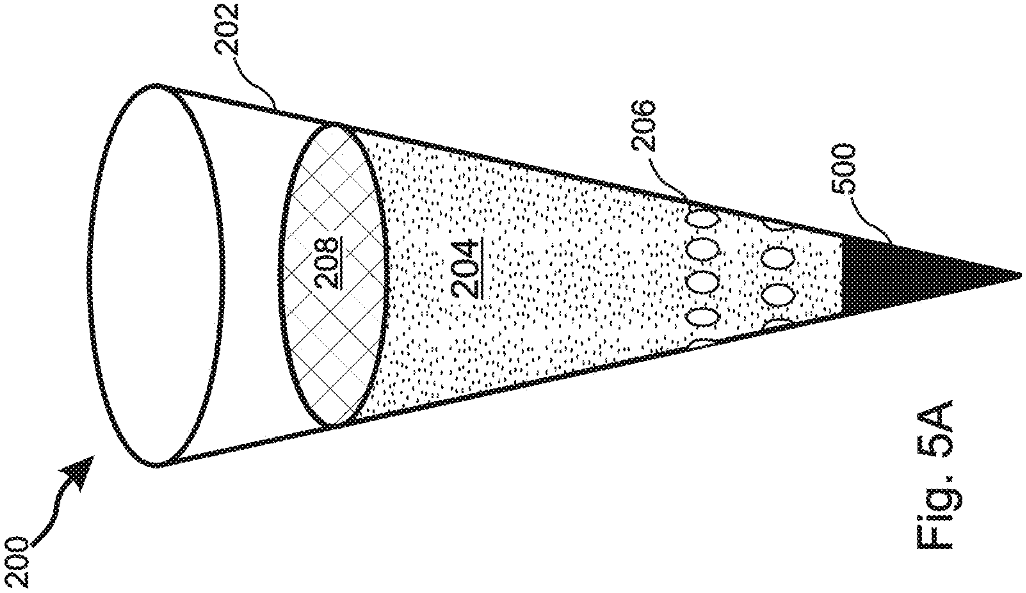
FIG. 5A is a perspective view of a seed planting device similar to FIG. 2, but including a weighted tip at the bottom thereof, the seed planting device being shown before deployment thereof.

With reference to FIG. 5A, in some embodiments the tapered container 202 is terminated by a weighted and hardened tip 500 that provides additional weight, energy, and penetrating power to the seeding cone 200. With reference to FIG. 5B, in some of these embodiments, the tip 500 is designed to be pushed away from the tapered container 202 by the growing roots 404 of the new vegetation 402, and/or to rapidly biodegrade after impact with the forest floor 300, thereby providing an opening 502 in the bottom of the tapered container 202 through which water and roots 404 can penetrate.

Figure 6A:
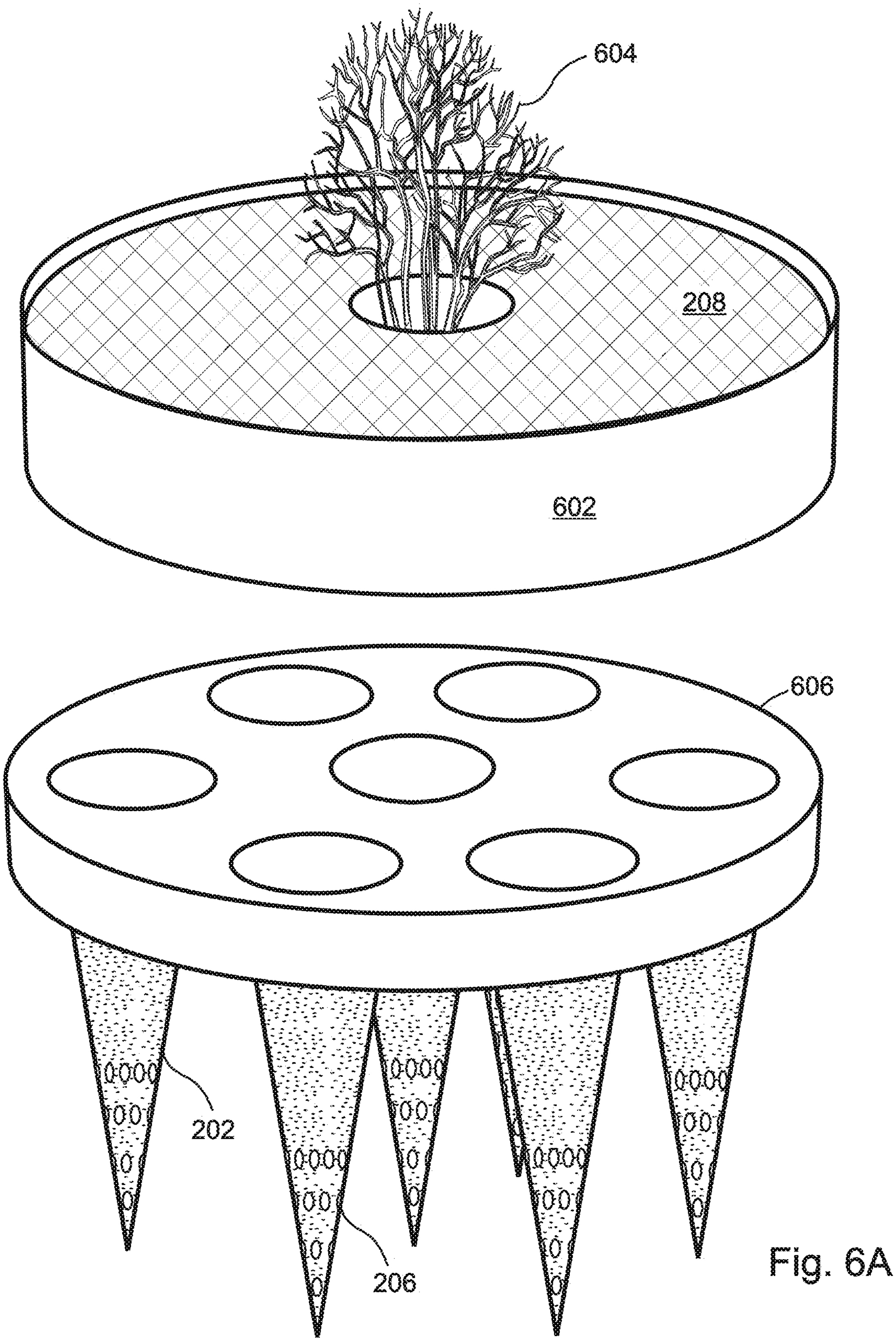
FIG. 6A is a partially exploded perspective view of a common frame and seed chamber that can allow one or more seedlings or saplings to extend roots simultaneously through a plurality of tapered containers.

With reference to FIG. 6A, in various embodiments a plurality of tapered containers 202 are mounted such that they all extend downward from a common frame 600, where the tops of the tapered containers 202 extend to openings 606 in the common frame 600. In these embodiments, the tapered containers 202 can be empty, or can be filled with any material or mixture of materials, such as sand, gravel, soil, SAPs, and fertilizer, that are conducive to the growth of vegetation. However, in these embodiments the tapered containers 202 typically do not contain seeds or seedlings. Instead, a single seed or seedling 604, or a plurality of seeds and seedlings, are included in a soil and seed mixture provided in an upper chamber 602 that extends upward from the frame 600. In FIG. 6A, the upper chamber 602 is shown above the frame 600 so that the structure of the frame 600 can be more clearly discerned. The weight of the assembly is sufficient to allow all of the cones 202 to penetrate through the hydrophobic layer 102, due to gravity and/or ballistic propulsion.

Figure 6B:
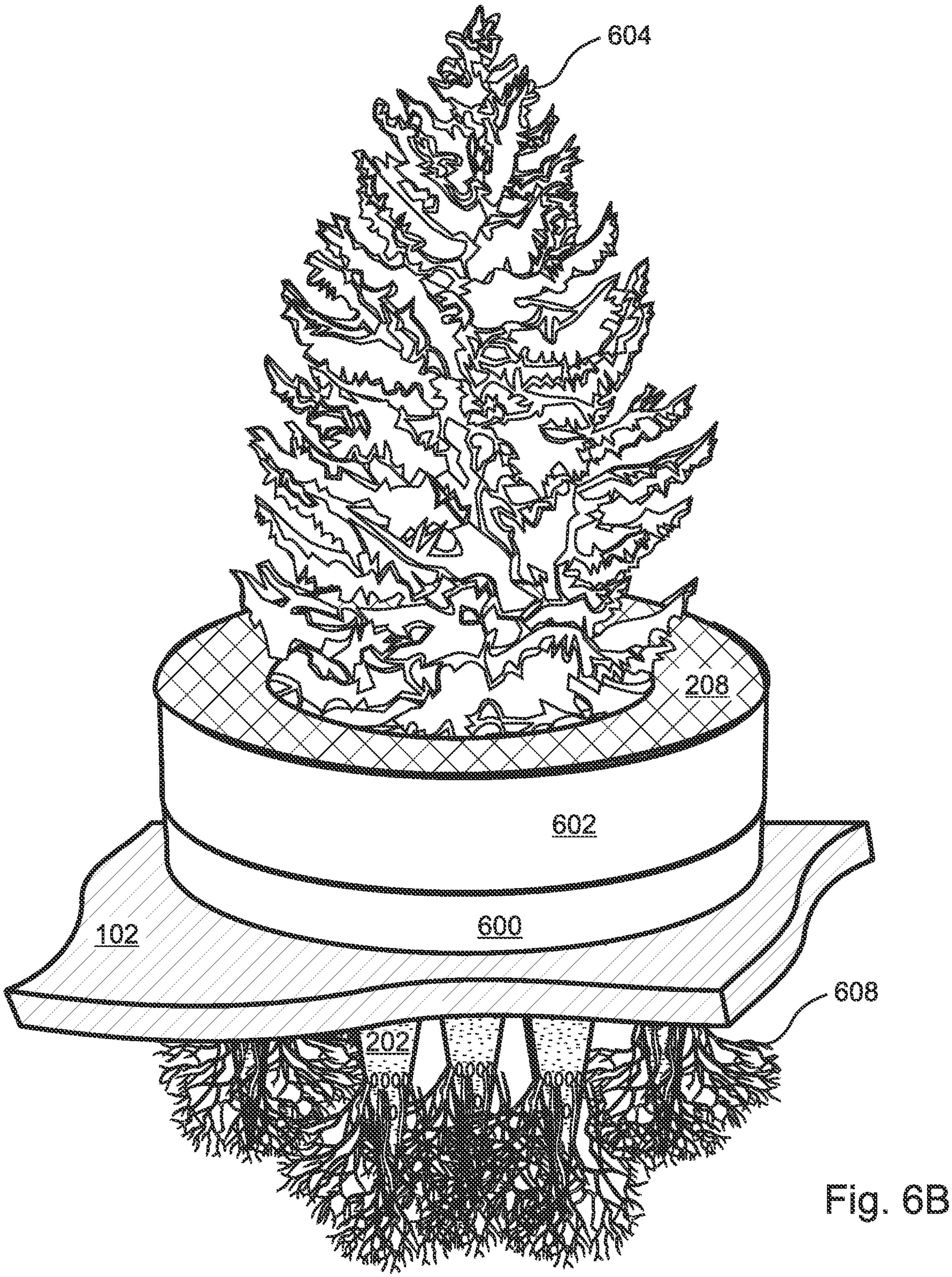
FIG. 6B is a perspective view of the frame and seed chamber of FIG. 6A shown after a single sapling has burst through the lid of the seed chamber and extended roots through all of the tapered containers.

With reference to FIG. 6B, some of these embodiments enable a larger plant 604 to be established, such as a sapling 604 that is intended to replace a burned tree of the forest, because the roots 608 of the plant 604 can extend simultaneously through all of the plurality of seeding cones 202, thereby establishing a larger root system 608 than might be possible for a plant that is germinated within a single seeding cone 202. Note that in the embodiment of FIGS. 6A and 6B, the upper screen 208 is frangible, and has been penetrated by the growing sapling or other plant 604.

Figure 7A:
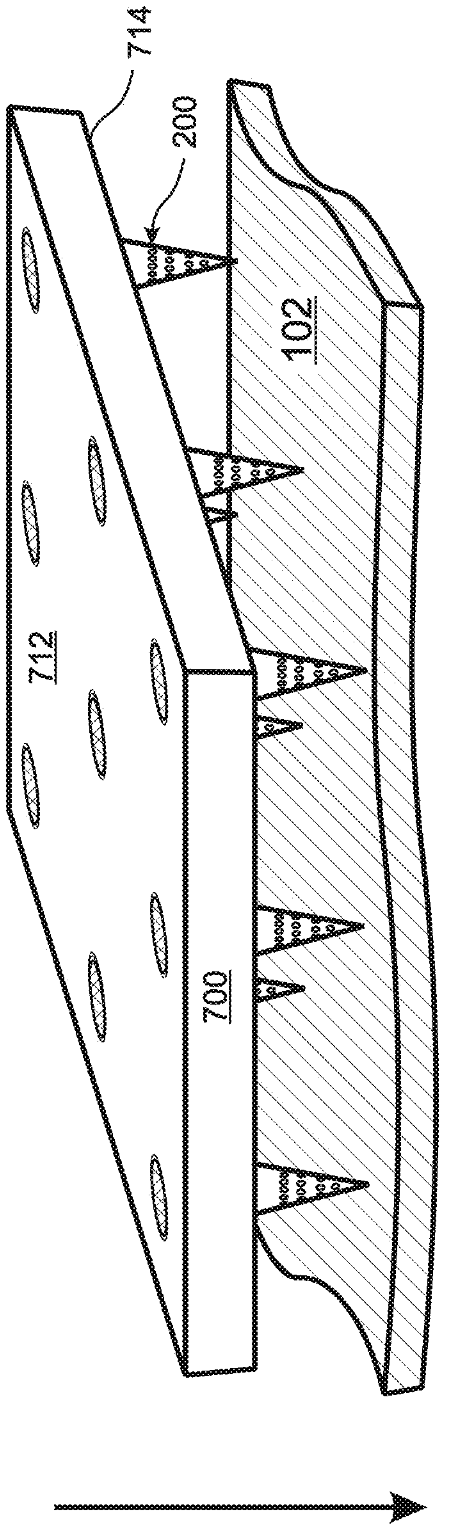
FIG. 7A is a perspective view of a tray to which a plurality of seeding cones are mounted for manual, simultaneous deployment through the hydroscopic layer.
Figure 7B:
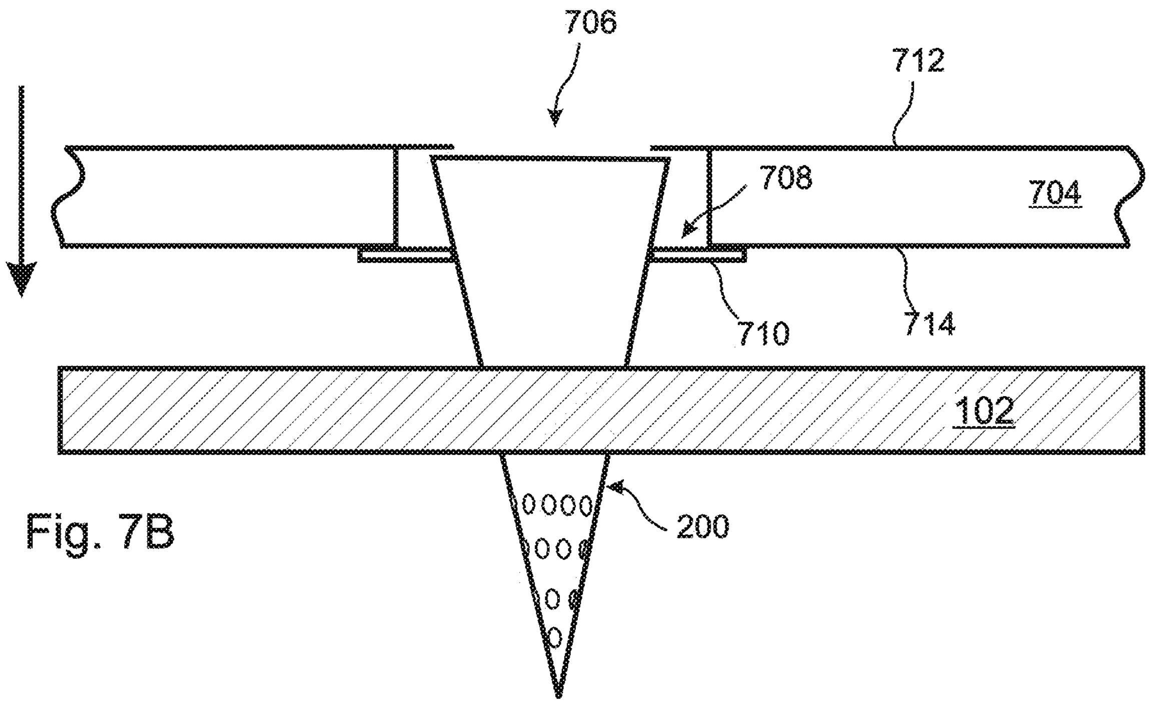
FIG. 7B is a cross-sectional view of one of the seeding cones of FIG. 7A illustrating a structure that is able to retain the seeding cones in the tray before deployment, and release them after deployment.

With reference to FIG. 7A, in other embodiments of the disclosed method, the seeding cones 200 are pressed into the soil by personnel on the ground. As is illustrated in FIG. 7B, in some of these embodiments a plurality of the seeding cones 200 are mounted to a rigid tray 700, such that the cones 200 extend below the tray 700. By placing the tray 700 with seeding cones 200 onto the ground, such that the points of the seeding cones 200 rest on the ground and support the tray 700, all of the seeding cones 200 can be simultaneously pressed onto the soil, for example by stepping on the tray.

With reference to FIG. 7B, in the illustrated embodiment the tray 704 has a top 712 and a bottom 714 that are both penetrated by concentric, overlapping holes 706, 708, wherein the upper holes 706 in the top 712 are smaller in diameter than the tops of the seeding cones 200, thereby ensuring that the seeding cones 200 will be pushed by the tray 704 into the soil when the tray 704 is pressed downward.

Figure 7C:
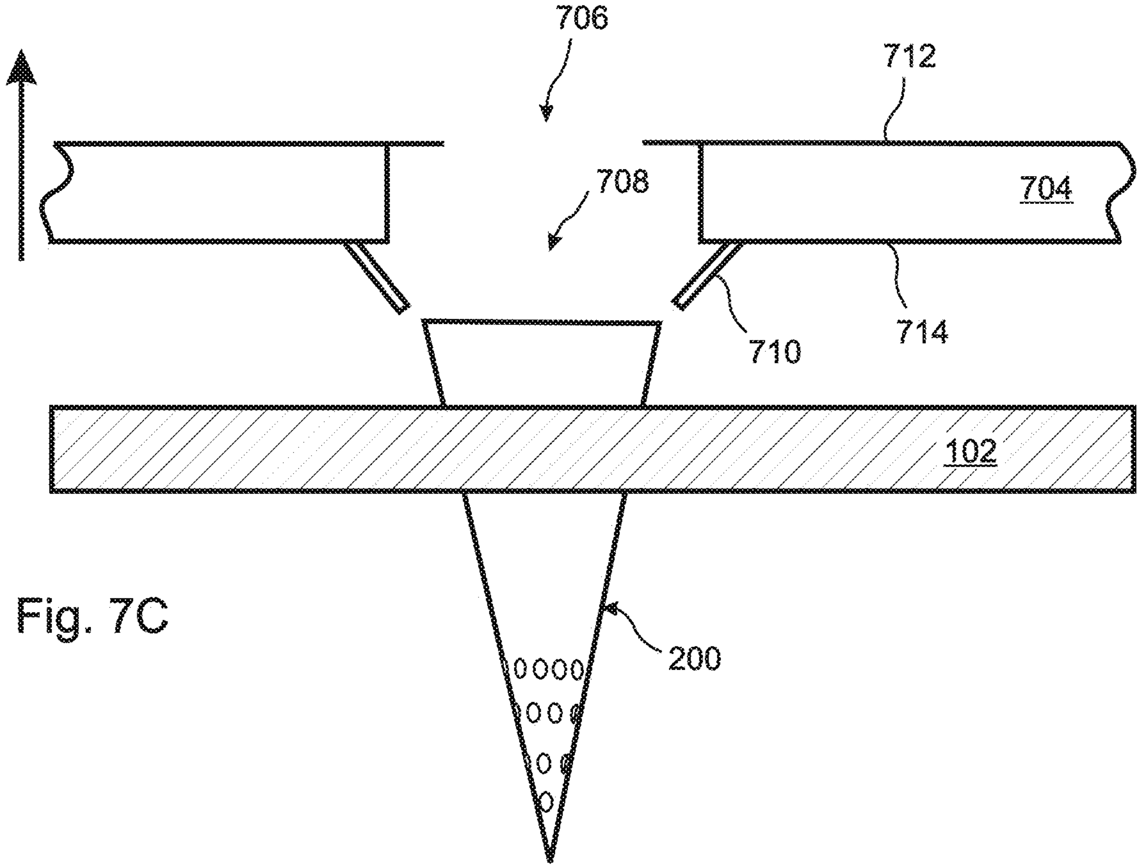
FIG. 7C is a cross-sectional view of the seeding cone and retaining structure of FIG. 7B illustrating release of the seeding cone from the tray after deployment of the seeding cone.

The lower holes 708 in the bottom 714 of the tray 704 are larger in diameter than the tops of the seeding cones 200. The seeding cones 200 are preventing from falling out through the larger holes 708 by frangible gaskets 710, made for example from cardboard, that are sufficiently strong to keep the seeding cones 200 from falling through the larger holes 708 solely due to gravity. With reference to FIG. 7C, the frangible gaskets 710 are configured to give way and allow the seeding cones 200 to pass through the larger holes 708 when the tray is lifted up and away from the ground after they the seeding cones 200 have been pressed into the ground, thereby allowing the seeding cones 200 to remain behind in the ground. The frangible gaskets 710 can be attached to the bottom 714 of the tray 704 by any convenient means, such as by rivets or screws, or by an adhesive.

In embodiments, the cones 202 and/or lids 208 and/or other components of the present invention are made from one or more biodegradable materials, such as from Ash-Crete, hempcrete clay, Timbercrete, bamboo, recycled wood, and/or other recycled materials, so that after the danger of mudslides has abated the seeding cones 200 can partially or fully biodegrade and blend into the soil.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

I claim:

1. A seed planting device comprising:

a tapered container having a top and a bottom, the tapered container being shaped as a cone or a truncated cone having an outer conical surface that is concentric about a vertical central axis, wherein a horizontal radius of the outer conical surface decreases linearly from the top to the bottom, and wherein a horizontal cross-sectional area of the top is larger than a horizontal cross-sectional area of the bottom;

at least one hole penetrating the tapered container proximate the bottom thereof; and one or more seeds, seedlings, and/or saplings contained within the tapered container;

wherein, before the seed planting device is deployed, no part of the seed planting device, including the one or more seeds, seedlings, and/or saplings, extends vertically or radially beyond the outer conical surface of the tapered container;

and wherein the seed planting device is configured, when dropped or propelled from an aircraft toward a forest floor, to penetrate through a hydrophobic layer of the forest floor in an area that has experienced a forest fire, and to enable the one or more seeds, seedlings, and/or saplings contained within the tapered container to germinate and grow out from the seed planting device, with roots extending below the hydrophobic layer.

2. The seed planting device of claim 1, further comprising a porous or perforated lid fixed within the tapered container above said plurality of seeds and/or seedlings.

3. The seed planting device of claim 1, wherein the one or more seeds and/or seedlings and/or saplings that are contained within the tapered container are mixed with at least one of soil, sand, gravel, super-absorbent polymer granules, fertilizer, and water.

4. The seed planting device of claim 1, wherein the bottom of the tapered container terminates in a point.

5. The seed planting device of claim 1, wherein the at least one hole includes an opening at the bottom of the tapered container.

6. The seed planting device of claim 1, wherein the at least one hole includes at least one hole penetrating a side of the tapered container proximate the bottom thereof.

7. The seed planting device of claim 1, wherein the tapered container comprises a weighted and pointed bottom tip.

8. The seed planting device of claim 7, wherein the weighted and pointed bottom tip is made from a biodegradable material.

9. The seed planting device of claim 7, wherein the weighted and pointed bottom tip is configured to be separated from the tapered container after deployment of the seed planting device, thereby creating an opening in the bottom of the tapered container.

10. The seed planting device of claim 1, wherein the tapered container is made from at least one biodegradable material.

11. The seed planting device of claim 10, wherein the at least one biodegradable material includes at least one of:

a concrete alternative comprising a mixture of fly ash, borate, bottom ash, and a chlorine compound;

hempcrete clay;

coir;

a masonry product containing a blend of cellulose, cement, sand, and binders;

bamboo; and recycled wood.

12. A seed planting device deployment assembly comprising a tray or common frame from which a plurality of seed planting devices each according to claim 1 extend downward, the tray or common frame being configured to press the plurality of seed planting devices into a forest floor so that the tapered containers penetrate through a hydrophobic layer of the forest floor in an area that has experienced a forest fire, and then to release the plurality of seed planting devices when the tray or common frame is lifted upward.

13. A method of planting vegetation in a forest floor after a forest fire that has created a hydrophobic layer on the forest floor, the method comprising:

providing a plurality of seed planting devices each according to claim 1; and deploying the plurality of seed planting devices by dropping or propelling them from an aircraft onto the forest floor, such that the plurality of seed planting devices penetrate through the hydrophobic layer, thereby enabling rain water to flow through the hydrophobic layer via the seed planting devices, and causing vegetation arising from the seeds and/or seedlings and/or saplings that are contained within the tapered containers of the seed planting devices to take root at least partially in soil that is beneath the hydrophobic layer.

14. The method of claim 13, wherein the aircraft is one of a piloted helicopter, a remotely controlled winged aircraft, and a remotely controlled hovering drone.

15. The method of claim 13, wherein the impact energy of the seed planting devices is derived entirely from gravitational acceleration after being released from the aircraft.

16. The method of claim 13, wherein the seed planting devices are ballistically propelled from the aircraft toward the forest floor.

17. The method of claim 16, wherein the seed planting devices are ballistically propelled by at least one of a compressed gas and a chemical explosive.

18. A method of planting vegetation in a forest floor after a forest fire that has created a hydrophobic layer within the forest floor, the method comprising:

providing a device deployment assembly according to claim 12;

placing the tray or common frame with the attached seed planting devices onto the forest floor, such that the tray or common frame is suspended above the ground by the seed planting devices;

pressing downward on the tray or common frame, thereby simultaneously pushing all of the seed planting devices into the forest floor, so that they penetrate through the hydrophobic layer; and removing the tray or common frame from the seed planting devices by lifting the tray or common frame upward, whereupon the seed planting devices are released from the tray or common frame, remain in the forest floor, and continue to penetrate the hydrophobic layer, thereby enabling rain water to flow through the hydrophobic layer via the seed planting devices, and causing vegetation arising from the seeds and/or seedlings, and/or saplings that are contained within the seed planting devices to take root at least partially in soil that is beneath the hydrophobic layer.

19. The method of claim 18, wherein the seed planting devices are attached to the tray or common frame by frangible gaskets that prevent the seed planting devices from gravitationally falling away from the tray or common frame, while allowing the seed planting devices to remain in the forest floor when the tray or common frame is lifted upward after the seed planting devices have been pressed into the forest floor.

* * * * *